United States Patent
Schulz et al.

(10) Patent No.: US 10,505,786 B2
(45) Date of Patent: Dec. 10, 2019

(54) ROOT CAUSE ANALYSIS OF FAILURE TO MEET COMMUNICATION REQUIREMENTS IN A PROCESS CONTROL SYSTEM

(71) Applicant: ABB Schweiz AG, Baden (CH)

(72) Inventors: Dirk Schulz, Meckenheim (DE); Stefan Bollmeyer, Minden (DE)

(73) Assignee: ABB Schweiz AG, Baden (CH)

( * ) Notice: Subject to any disclaimer, the term of this patent is extended or adjusted under 35 U.S.C. 154(b) by 40 days.

(21) Appl. No.: 15/780,540

(22) PCT Filed: Dec. 3, 2015

(86) PCT No.: PCT/EP2015/078519
§ 371 (c)(1),
(2) Date: May 31, 2018

(87) PCT Pub. No.: WO2017/092812
PCT Pub. Date: Jun. 8, 2017

(65) Prior Publication Data
US 2018/0367368 A1    Dec. 20, 2018

(51) Int. Cl.
*H04L 12/24*    (2006.01)
*G05B 19/418*    (2006.01)
(Continued)

(52) U.S. Cl.
CPC ........ *H04L 41/065* (2013.01); *G05B 19/4186* (2013.01); *G06F 11/079* (2013.01); *H04L 41/12* (2013.01); *G06N 7/005* (2013.01)

(58) Field of Classification Search
USPC ................................. 709/224–226
See application file for complete search history.

(56) References Cited

U.S. PATENT DOCUMENTS 6,647,886 B2 * 11/2003 Darraba ............... B60R 21/017
                                                          102/200
7,372,592 B2 *  5/2008 Murakata .......... G03G 15/5075
                                                          358/1.13
(Continued)

FOREIGN PATENT DOCUMENTS

EP    2814285 A1    12/2014
GB    2485093 A     5/2012

OTHER PUBLICATIONS

International Search Report and Written Opinion of the International Searching Authority Application No. PCT/EP2015/078519 completed: Aug. 25, 2016; dated Sep. 30, 2016 10 pages.

*Primary Examiner* — Jude Jean Gilles
(74) *Attorney, Agent, or Firm* — Whitmyer IP Group LLC (57) ABSTRACT

A method for locating a possible root cause of system discrepancy in a process control system uses a system model including software representations of process control endpoint devices interconnected via a communication network using a number of links, where each link is provided for communication in relation to a process control function between two endpoint devices and includes a set of communication network elements and a reference to a set of communication parameters of the process control function. In the method an indication that at least one communication parameter deviates from a communication requirement is obtained, a link where reference is made to the communication parameter identified, communication network elements contributing to the functioning of the link identified and at least one of the communication network elements indicated as a possible cause of the deviation.

23 Claims, 6 Drawing Sheets

(51) Int. Cl.
*G06F 11/07* (2006.01)
*G06F 15/16* (2006.01)
*G06N 7/00* (2006.01)

(56) References Cited

U.S. PATENT DOCUMENTS

| | | |
|---|---|---|
| 8,160,843 B2 | 4/2012 | Kroger et al. |
| 9,043,716 B2 * | 5/2015 | Jundt ................. G05B 19/0426 |
| | | 715/736 |
| 2004/0117166 A1 | 6/2004 | Cassiolato |
| 2004/0186697 A1 | 9/2004 | Schreier et al. |
| 2006/0236267 A1 | 10/2006 | Gierschik et al. |
| 2008/0208527 A1 * | 8/2008 | Kavaklioglu ........ C10G 11/187 |
| | | 702/179 |
| 2010/0034168 A1 * | 2/2010 | Mahdi ................... H04W 36/14 |
| | | 370/331 |
| 2011/0302390 A1 * | 12/2011 | Copeland ............. G06F 9/5061 |
| | | 712/2 |
| 2014/0269854 A1 * | 9/2014 | Wong ................. G06F 13/4291 |
| | | 375/219 |
| 2016/0344587 A1 * | 11/2016 | Hoffmann ............. H04W 24/02 |
| 2017/0250902 A1 * | 8/2017 | Rasanen ............... H04L 45/306 |
| 2018/0332524 A1 * | 11/2018 | Rasanen ................. H04W 4/40 |

* cited by examiner

| System Applications | Communication connection resources | | Communication device resources | |
|---|---|---|---|---|
| | [8, System Layer] 'IO List' | | | Name |
| Name | Name | Type | Name | AC800M CI871 |
| Network Management | MotorVariableSpeed signal bundle | Cyclic | Data Input/Output | ACS880 |
| Process Area 1 Closed-Loop Control | MotorStartStop signal bundle | Cyclic | Data Input/Output | MNSiS Demo Case |
| Field device management | Video trunk | Cyclic | Data Input/Output | |
| Mobile workforce | Field device management (South) | Cyclic | | |
| Video surveillance | Field device management (North) | Cyclic | | |
| | Network managment | Cyclic | | |
| Applications FI | Signals SI | | Device Functions DF | Device ED |

Fl: Closed Loop Control
ED: AC800M C1871 LOC1, MNSiS Demo Case LOC2
CR: Requirements of SI1 and SI2 (Motor Variable Speed Signal, Motor StartStop Signal), Protocols: Profinet IO, Hart
Network nodes: Ethernet Switch, Remote IO
Communication media: CM1, CM2, CM3

TA for L1

ROOT CAUSE ANALYSIS OF FAILURE TO MEET COMMUNICATION REQUIREMENTS IN A PROCESS CONTROL SYSTEM

TECHNICAL FIELD

The present invention generally relates to process control systems. More particularly the present invention relates to a problem investigating device as well as a method and a computer program product for locating a possible root cause of system discrepancy in a process control system.

BACKGROUND

A process control system may be provided in an industrial plant. Such a system normally comprises a number of process control devices involved in the control of the process. The operation of these devices is typically monitored by plant operators via operator terminals of the system.

A network forming unit, for instance in the form of a network simulation tool, may be provided for the process control system, which network forming unit may support the design of a communication infrastructure or communication network to be used for the process control system and the process control applications or functions using it. This network forming unit may not only be provided for suggesting a system model of the infrastructure, but may also be used for simulations of the communication through it.

One example of such a network forming unit is discussed in U.S. Pat. No. 8,160,843. The unit according to the document receives system function information and device location information and determines a communication infrastructure.

US 2004/0117116 is concerned with determining how many devices are to be connected to a fieldbus segment of a process control system.

Such a system model may thus be created for suggesting a communication network that is to be implemented for the process control system. This model may then be used for building a real communication network.

When looking at the real communication network or network with regard to an application having a problem in fulfilling a communication requirement, it may be hard to tell where in the communication network the problem occurs. It is also hard to tell how critical the failure of a particular network element would be. Therefore appropriate counter-measures may be hard to implement. Furthermore the investigation of the problem would typically involve an expert, meaning typical automation engineers cannot do tasks like root-cause and impact analysis.

It would therefore be of interest to improve on the above-mentioned situation.

SUMMARY

The present invention addresses the problem of locating the root cause of a system discrepancy in a process control system.

This is generally done through using a system model for the identification of a possible infrastructure element that is a likely cause of a failure to fulfill a communication requirement.

According to a first aspect of the invention this object is more particularly solved with a problem investigating device for a process control system. The problem investigating device comprises a system model comprising software representations of process control endpoint devices interconnected via a communication network using a number of links. Each link is a provided for communication in relation to a process control function between two endpoint devices and comprises a set of communication network elements and a reference to a set of communication parameters of the process control function. The problem investigating devices also comprises a root cause analyzing unit. The root cause analyzing unit is configured to:
 obtain an indication that at least one communication parameter deviates from a corresponding communication requirement,
 identify a link where reference is made to the communication parameter,
 identify the communication network elements contributing to the functioning of the link, and
 indicate at least one of the communication network elements as a possible cause of the deviation based on the communication network element identification.

This object is according to a second aspect of the invention solved through a method for locating a possible root cause of system discrepancy in a process control system using a system model comprising software representations of process control endpoint devices interconnected via a communication network using a number of links. Each link is provided for communication in relation to a process control function between two endpoint devices and comprises a set of communication network elements and a reference to a set of communication parameters of the process control function. The method is performed by a root cause analyzing unit of a problem investigating device and comprises:
 obtain an indication that at least one communication parameter deviates from a corresponding communication requirement,
 identifying the link where reference is made to the communication parameter,
 identifying the communication network elements contributing to the functioning of the link, and
 indicating at least one of the communication network elements as a possible cause of the deviation based on the communication network element identification.

This object is according to a third aspect of the invention solved through a computer program product for locating a possible root cause of system discrepancy in a process control system using a system model comprising software representations of process control endpoint devices interconnected via a communication network using a number of links. Each link is provided for communication in relation to a process control function between two endpoint devices and comprises a set of communication network elements and a reference to a set of communication parameters of the process control function. The computer program product is provided on a data carrier comprising computer program code configured to cause a problem investigating device to, when the computer program code is loaded into the problem investigating device:
 obtain an indication that at least one communication parameter deviates from a corresponding communication requirement,
 identify the link where reference is made to the communication parameter,
 identify the communication network elements contributing to the functioning of the link, and
 indicate at least one of the communication network elements as a possible cause of the deviation based on the communication network element identification.

The present invention has a number of advantages. It allows a fast and automatic determination of one or more communication network elements that is/are possible root causes of a communication parameter failing a communication requirement. Thereby the downtime of the process control system may be limited. Network problems can be found fast and reliably, reducing downtime risks or actual downtime of the process or process-related functions. Thereby the process control system also becomes more reliable overall. No expert knowledge is furthermore required by a user wanting to identify such network elements.

BRIEF DESCRIPTION OF THE DRAWINGS

The present invention will in the following be described with reference being made to the accompanying drawings, where FIG. 1 schematically shows a process control system comprising process control devices, FIG. 2 schematically shows one way of realizing a problem investigating device for use in relation to process control systems, FIG. 3 schematically shows another way of realizing the problem investigating device.

FIG. 9 shows a tag that has been formed for the link in FIG. 7, FIG. 10 schematically shows a flow chart of a number of method steps in a method of locating a possible root cause of system discrepancy.

DETAILED DESCRIPTION

In the following, a detailed description of preferred embodiments of a problem investigating device as well as a method and a computer program product for locating a possible root cause of system discrepancy in a process control system will be given.

Figure 1:
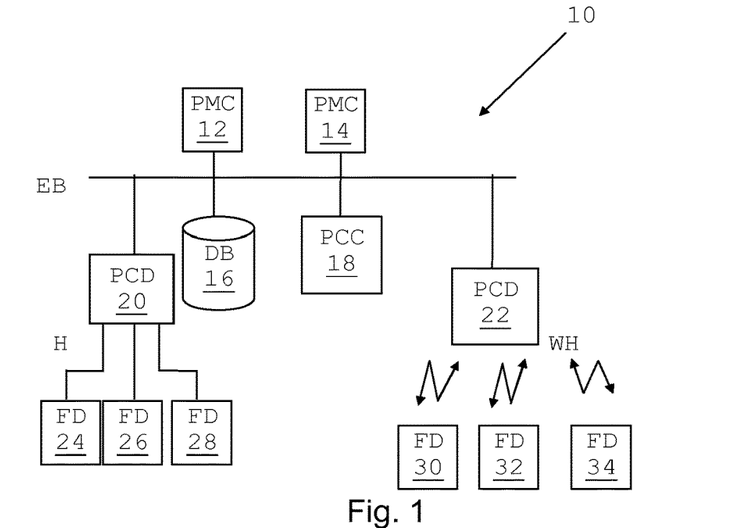

FIG. 1 schematically shows a process control system 10, which may be provided in the premises of an industrial plant. The process control system 10 is a computerized process control system for controlling an industrial process. Examples of industrial processes that may be controlled are electrical power generation, transmission and distribution processes, water purification and distribution processes, oil and gas production and distribution processes, petrochemical, chemical, pharmaceutical and food processes, and pulp and paper production processes. These are just some examples of processes where the system can be applied. There exist countless other industrial processes. The processes may also be other types of industrial processes such as the manufacturing of goods. A process may be monitored through one or more process monitoring computers or controllers, which communicate with a computer or server handling monitoring and control of the process.

In FIG. 1 the process control system 10 therefore includes a number of process monitoring computers (PMC) 12 and 14. These computers may here also be considered to form operator terminals and are connected to a first data bus EB, which in this example is an Ethernet databus on which a certain protocol is used, which protocol may as an example be the Profinet IO protocol. A process monitoring computer may furthermore be acting as a problem investigating device. There is also a process control computer (PCC) 18 and a database (DB) 16 connected to the first data bus EB. To this first data bus EB there is also connected a first and a second protocol conversion device (PCD) 20 and 22. A protocol conversion device may also be termed a remote IO device. A protocol conversion device may have point-to-point connections with a number of field devices. On at least one of these point-to-point connections another communication protocol is used, which as an example may be the HART protocol. A protocol conversion device may also have a wireless connection with a number of field devices on which a wireless protocol may be used, such as a Wireless HART protocol WH.

Figure 2:
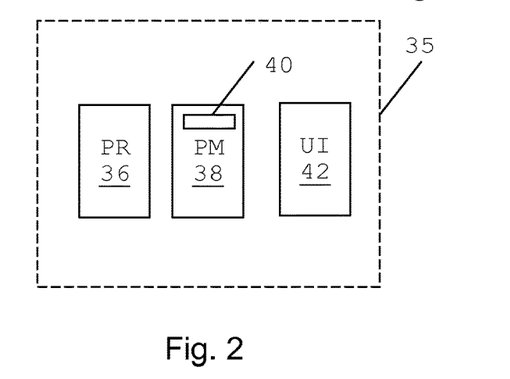

To the first remote IO device 20 there is connected a first group of further devices 24, 26 and 28 and to the second remote IO device 22 there is connected a second group of further devices 30, 32 and 34. These further devices 24, 26, 28, 30, 32 and 34 are field devices, which are devices that are interfaces to a process being controlled. A field device is therefore an interface, such as a sensor, via which measurements of the process are being made or an interface, such as an actuator, to which control commands are given for influencing the process. A field device may also be a combined sensor and actuator. A field device may as an example be a tank and another as an example a centrifuge. The process control computer 18 may be involved in controlling the process based on inputs from field devices, such as from sensors, and actuating the same or other field devices, such as valves, based on the inputs. The field devices and control computer are all examples of process control devices. Furthermore, the field devices and control computer are both examples of endpoint devices in a communication infrastructure or communication network employed by the process control system, while the remote IO devices, buses and point-to-point-connections are examples of communication infrastructure elements or communication network elements in the form of communication network nodes and communication media. The communication network may also comprise cables with the buses or communications lines as well as routers and switches. As can be seen in FIG. 2, the first group of further devices 24, 26 and 28 are wired devices connected to the first remote IO device 20 via a-fixed point-to-point connections and the second group of further devices 30, 32 and 34 are wirelessly connected to the second remote IO device 22.

As described above, one process monitoring computer may be acting as a problem investigating device. However, it should be realized that such a device does not have to be provided in a process monitoring computer or even be a part of the process control system. It may be a separate entity.

The problem investigating device may as an alternative to be considered to be a network simulation tool because it is with advantage provided as a software tool that can be used to perform simulations in a system model of a communication network of the process control system. One way of realizing the problem investigating device 35 is schematically shown in FIG. 2. The problem investigating device 35 may be realized as a computer comprising a processor (PR) 36 with program memory (PM) 38 comprising a computer program 40 with computer program code implementing the functionality of the problem investigating device 35. As an alternative it is possible that the functionality is implemented using dedicated circuits such as Field-Programmable Gate Arrays (FPGAs) or Application Specific Integrated Circuits (ASICs). The problem investigating device 35 may also comprise a user interface (UI) 42 for instance in the form of a display and mouse/keyboard combination.

Figure 3:
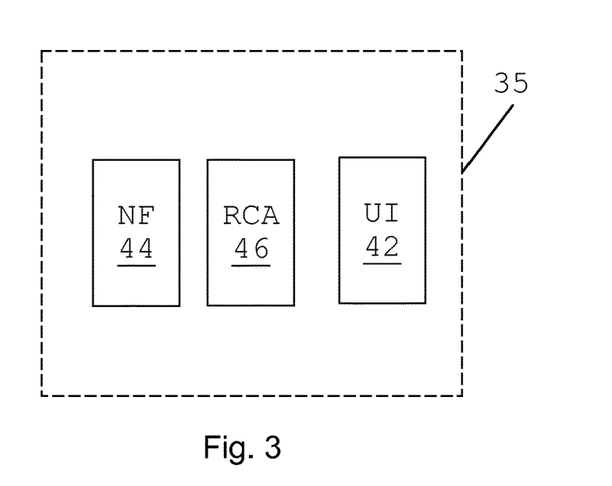

Another way of realizing the problem investigating device 35 is shown in FIG. 3. The problem investigating device 35 may comprise a network forming unit (NF) 44 and a root cause analyzing unit (RCA) 46 in addition to the user interface (UI) 42. The network forming unit 44 of the problem investigating device 35 may with advantage be used by a network planning user, while the root cause analyzing unit 46 may be used by a troubleshooting user. It is also here possible that these units are provided in the form of software or one or more dedicated circuits such as FPGAs and ASICs.

When designing a process control system the network planning user may use the network forming unit 44 of the problem investigating device 35 for automated calculation or modelling of a communication network that is to be used by the process control system. The network forming unit 44 may thus create a system model of the communication network for use in relation to the process control system. The system model may with advantage be an offline model, i.e. a model that is distinctly separate from the operated process control system. The system model may thus be separate from the actual communication network being implemented.

Generally speaking, the network forming unit 44 allows the network planning user to select a graphical object representing an element that is to be used for communication such as a backbone or a fieldbus link, a data ring, a star topology, or a multiple of the former for added redundancy, and connect it to another graphical object representing a data path or end point or communication network device.

Graphical objects representing functional nodes, infrastructure nodes (router, access points, etc.) or servers, etc. can be selected and placed in a network, representing design choices that an automated calculation must consider as additional requirements. The objects may be duplicated, replaced or moved around at will. Links, rings, backbones etc. can be re-sized and/or have other structures added (connected) using graphical manipulation of the objects similar to a computer drawing application.

More specifically the network forming unit 44 allows the network planning user to select constraints on the planning for instance by choosing graphic objects representing implementation options for data paths between the functional end devices and over dedicated network elements and configure them in the system model of the communication infrastructure.

The modelling performed by the network forming unit 44 may involve deriving a selection of functional nodes for performing process control functions, a communication infrastructure layout, i.e. a layout of the communication network, configuration/parameterization of the number of functional nodes (sensors, actuators, controllers, etc.) and communication network nodes required by the process control functions.

Furthermore, the network forming unit 44 may also perform a calculation of the communication requirements of signals used by the process control functions. The communication requirements or communication parameters may involve amounts and frequency, latency, availability, segregation needs, etc. of data communication traffic between the functional nodes required by one or more automation or process control functions. A functional node is thus a node in the process control system and for this reason it is also an end point device for communication with another end point device in the communication network being designed.

Data communication requirements may for instance be calculated from customer requirements (preferably auto or semi-automatically from a sales support tool) or process engineering outputs imported as scanned images and/or annotated images, resource documentation (e.g. in XML, or table-based information in CSV, Excel, etc.) of other project requirements (number of tags, translation of a PID schema etc.), and one or more selected automation application(s). Communication requirements for a process control function and a pair of communication endpoints include the endpoints to connect, and quality of service (QoS) key performance indicators (KPIs) for the communication parameter, such as a signal of the process control function. A KPI may be bandwidth, cycle/round-trip time or simple delays, allowed jitter, availability, etc. Also type of service, i.e. in what way signals are to be sent, like cyclic/periodic, event-based/on-demand, streaming, etc. may be a part of the communication requirements.

Aspects of the network forming unit 44 are directed towards allowing the network planning user to select end point devices and process control functions and based on the user selections, the network forming unit 44 then suggests communication network elements to be placed between the end point devices. The suggestions may not only comprise suggestions about communication network elements such as routers, switches and cables. It may also comprise logical connection suggestions, for instance according to the Open Systems Interconnection (OSI) model by the International Organization for Standardization (ISO). The network forming unit 44 may for instance make logical connection suggestions from layer 2 up to layer 7 of the OSI model and above. The suggestion may be based on pre-defined rules that are based on best practices, technology and resources, where the best practices may consider premises layout, technology may consider addressing used and resources may consider the types and availability of existing equipment.

Figure 4:
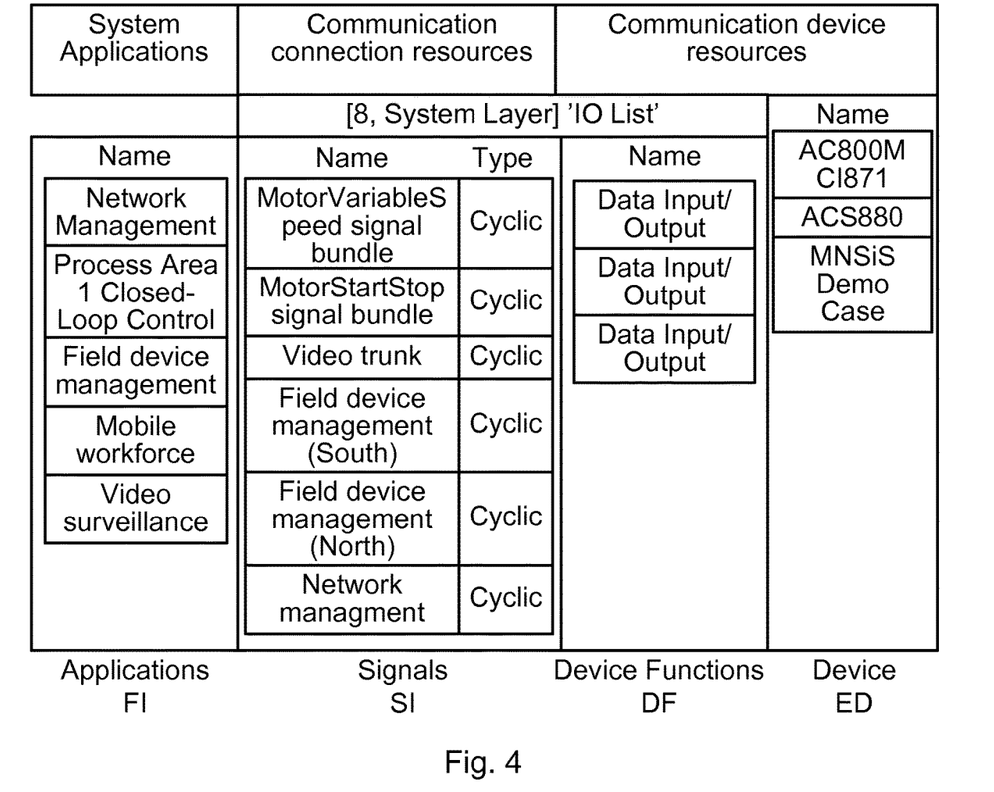
FIG. 4 shows a graphical representation of the system model comprising a number of process control entities that may be selected by a user in the forming of a system model of a communication network for the process control system.

FIG. 4 shows an example of a graphical representation of the system model where a few items are shown in the form of applications or process control functions FI, signals SI, device functions DF and end point devices ED.

As an example the network planning user may select among items representing endpoint devices. Examples of selectable endpoint devices are shown in the end device column in FIG. 4. The network planning user may possibly also select a process control function in which the endpoint devices are to communicate with each other. The user may optionally also select a set of communication parameters of the communication between the end point devices, such as a set of signals of the process control function to be sent between the end point devices. In this case the communication requirements on communication parameters of the function may be added by the network forming unit 44.

A selection of an item, will lead to a corresponding software object being inserted into the system model. Each software object when inserted into the system model is then automatically associated with requirements necessary for connecting to other software objects in the model representing other endpoint devices or communication network elements. The software objects are examples of software representations of the endpoint devices and communication infrastructure elements. It should be realized that other types of software representations are possible. The communication parameters for an end point device may be provided as a part of the software object representing the endpoint device or as one or more separate software objects having a relationship or being linked to the software object representing the endpoint device. The communication parameters for an end point device connected to a data link or backbone may as an example include signal information, configuration of e.g. Internet Protocol (IP) address, connections to/between, data performance e.g. or other Key Performance Indexes (KPIs).

The network planning user may thus select endpoint devices that are to implement process control functions and communication parameters, such as the signals to be exchanged between the endpoint devices. The network planning user may also select endpoint device functions or end point device applications performing the endpoint device functions, such as control or data input/output and possibly also communication protocols to be used. An application is thus an application realising a function implemented on an endpoint device. An application may be a software-based service that is engineered or delivered individually. Each application may have to work according to a specification. An application may as an example be an International Electrotechnical Commission (IEC) 61131 application for closed loop control, a Device management application, a Plant asset management application, a Network management application, a Security monitoring application, a Process operation application or a Manufacturing Execution System (MES) application. The network forming unit 44 may therefore also add a software object representing an application implemented by an endpoint device into the system model. Such an application may then be added as code in the software object representing the endpoint device or as a separate software object referencing the software object referencing or linked to the end point device.

Based on process knowledge, the network planning user may thus select a process control computer, a field device that is to communicate with the process control computer, a process control function to be implemented by an application of the selected endpoint devices as well as the signals exchanged by the end point devices and communication protocols used. The network forming unit 44 of the problem investigating device 35 may then insert software objects representing these entities into the system model and add the communication requirements of the application, such as the bandwidth, latency and type of service requirements of these signals. The communication requirements may be added to the above-mentioned inserted software objects or as separate software objects referencing them. The network forming unit 44 may also make further communication settings, such as communication settings according to the OSI layer model. Examples on such settings are data link layer settings and network layer settings. As an alternative it is possible that the selection of an item and the inserting of the corresponding software object in the system model may also lead to an automatic selection of another item and the insertion of corresponding software in the system model. It is for instance possible that an end point device is associated with a communication protocol so that the selection of a particular end point device automatically results in the selection of a corresponding communication protocol. The selection of a certain end point device may also be a selection of a corresponding process control function. It is also possible that the selection of a certain process control function at the same time leads to certain signals being selected. This means that a selection of a particular end point device may lead to the problem investigating device 35 selecting a communication protocol and/or a corresponding endpoint device function and/or corresponding signals.

A network planning user may in this way select the end point devices that are to communicate with each other, the functions for which the communication is to take place, signals and communication protocols. It is in this respect also possible that some or all of the communication requirements may be selected, such as time and service requirements on the signals. Some or all of the communication requirements may also be automatically set by the problem investigating device 35 once a function and optionally also a signal is selected by the network planning user.

Figure 5:
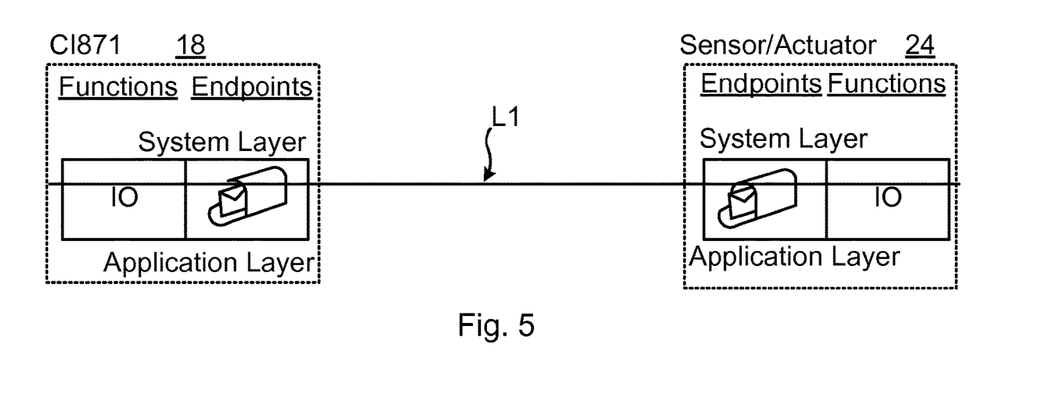
FIG. 5 shows a link between two communication endpoint devices being created by the user.

As an example, again with reference to FIG. 4, a user may select a process control function, such as Closed-loop control, and two endpoint devices, the process control computer 18 and the first field device 24. Graphical objects representing the endpoint devices 18 and 24 may then be placed on a separate canvas by the network forming unit 44 and set to communicate with each other in the system model through the network planning user interconnecting the objects with a line that forms a communication link L1, as seen in FIG. 5.

Figure 6:
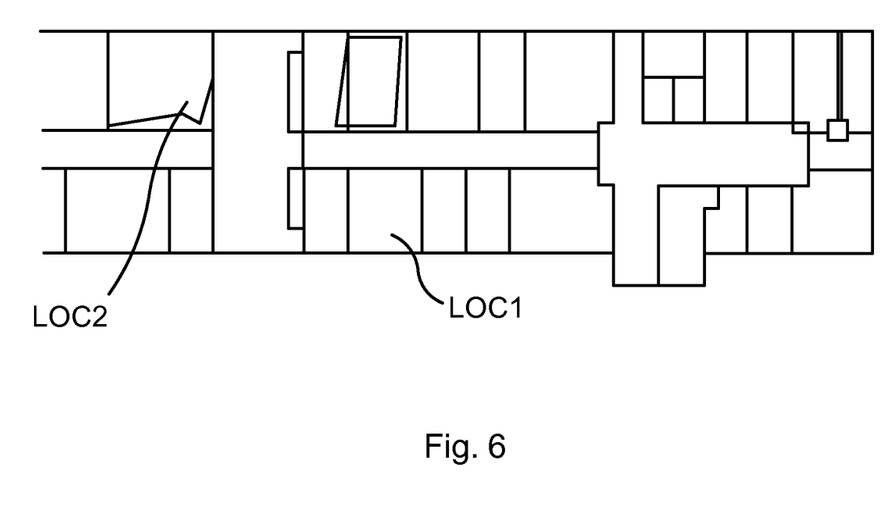
FIG. 6 schematically shows a floor of a building with different locations at which the end point devices may be placed, FIG. 7 schematically shows the link when communication protocols and network elements of the communication network have been added to the link between the endpoint devices.

The network planning user may also select a physical location for the physical devices corresponding to the planned endpoint devices in the system model. The selection of physical location is thus a selection of a location for the physical end point devices in the premises. An example of such locations on a map can be seen in FIG. 6. The user may as an example select a first location LOC1 in a room on a floor of a first building of the plant as the location of the physical process control computer 18 and may select a second location LOC2 in another room on the same floor of the same building as a location of the physical first field device 24. It should here be realized that the user may have selected one of the locations to be on another floor of the same or another building instead. The location may then be translated into a Global Positioning System (GPS) position. Alternatively the user selects GPS positions directly and these positions may be translated into a location on a map. Based on this input of location, the network forming unit 44 selects a logical location of the corresponding end point device in the system model. It is here possible that the network forming unit 44 visualizes the placing of the end point devices on the map in FIG. 6 for the network planning user once the user selected location is known.

Once the network planning user has made the above-mentioned selections, the network forming unit 44 of the problem investigating device 35 determines a set of elements of the communication network that are to interconnect the end point devices of the communication link L1 in the system model. It thus determines which endpoint devices that are to be interconnected in the system model using a virtual communication network comprising virtual communication network elements.

The network forming unit 44 may thus with advantage be used for suggesting infrastructure that is to interconnect the various end point devices that make up the process control system. The communication requirements of the applications may in this case be used as rules for the suggestions.

Figure 7:
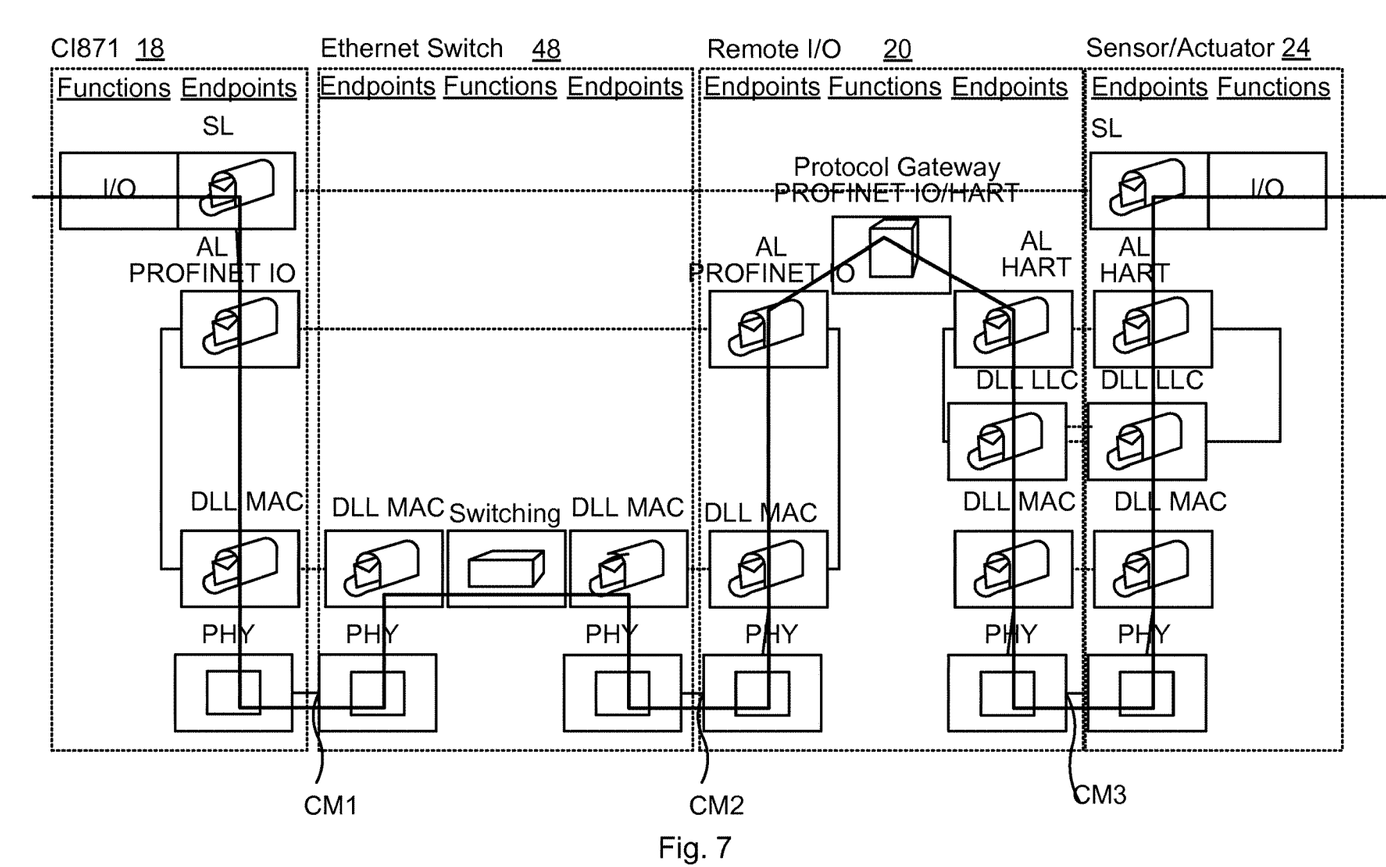

FIG. 7 schematically shows a suggestion for the example of a process control computer 18 and a first field device 24 in the link L1. The process control computer 18 at the first location LOC1 may need to communicate with several other end devices using a Profinet IO connection. Therefore the network forming unit 44 of the problem investigating device 35 may suggest the introduction of a virtual Ethernet switch 48, for instance at a logical location corresponding to the first location LOC1, and a first virtual communication medium CM1 for connection to the first virtual Ethernet switch 42, which first virtual communication medium CM1 is a virtual Ethernet cable. The virtual first field device 24, which needs to use the HART protocol, is in turn suggested to be connected to the virtual first remote IO device 20 at a logical location corresponding to the second location LOC2 via a third virtual communication medium CM3 in the form of a point-to-point HART link and the virtual first remote IO device 20 is then suggested to be connected to the virtual Ethernet switch 48, via a virtual second communication medium CM2, which may also be in the form of an Ethernet cable.

It can be seen in FIG. 7 that the end point devices and the network nodes are layered according to the OSI layer model.

There are logical network functions in between applications and devices. The process control functions, which run on the application layer of the OSI layer model, are already connected during the process of the process control function engineering. As can be seen in FIG. 7, the network forming unit 44 of the problem investigating device 35 refines this by adding connections on each lower OSI layer until the physical layer is reached; like two points on a nail board connected by a rubber band, if you will, the band is strung around more and more nails until it takes the path along the layers and network hops that are needed. Thus eventually, the actual connection between devices is realized by a chain or mesh of interconnected devices implementing some or all of the ISO/OSI layers in their protocol.

In order to allow an incremental implementation of an algorithm to generate these ISO/OSI implementations, one or more of the intermediate logical network layers are individually represented.

The logical connections may thus be implemented by application layer connections such as PROFINET IO or HART, running on an IP network or directly on a logical layer 2 network segment (Ethernet, HART network), eventually being deployed on physical layer cables or radio frequencies. It should be realized that also a wireless implementation using for instance Wireless HART is possible.

The suggested communication network may furthermore be selected so that the structure of the facility is considered. There may for instance be an Ethernet switch on each floor in a building and a separate Ethernet switch for the whole building. Thereby, depending on the selected locations, a number of virtual infrastructure devices in-between the two end devices are suggested by the problem investigating device 35 based on the selection of the endpoint devices. Furthermore, the time and bandwidth requirements of the communication parameters, such as signals, of the applications are also considered. Virtual infrastructure devices forming network nodes are thus suggested between the end point devices based on the communication requirements. The amount of communication media used, i.e. the number of cables and communication lines selected in the communication infrastructure, is also based on the communication requirements. If for instance the bandwidth of a cable is too low because of too many signals, then additional cables and switches may be suggested.

It is also possible that the network planning user makes a redundancy setting regarding at least one signal or an application. In this case, it is also possible for the network forming unit 44 to suggest parallel paths via separate cables and separate switches of the link having the redundancy setting.

Furthermore, as can also be seen in FIG. 7, the suggestion of communication network elements may depend on the different data communication protocols. There may in this regard be a sequence of different protocols between two endpoint devices that need to communicate with each other while supporting different communication protocols. The multiple protocols may be visible in a graphic visualization (in e.g. a table structure) showing the end-to-end devices and the protocols in between nodes or devices displaying e.g. as a fieldbus hierarchy to the user.

The system model may be arranged with more than one alternative (redundant) communication path between many of the network nodes. Simulations may be run in which different prioritizations can be selected in one or more of the applied protocols to arrive e.g. by experiment to achieve an optimal strategy for using the protocols (e.g. according to a rule or constraint) to achieve e.g. higher KPIs for selected applications or satisfactory or improved KPIs for a selected network path when component failure knocks out e.g. one alternative data path.

A predictable possibility is that when selecting a data communication structure (ring, backbone, star etc. from a number of choices in a list) that the network forming unit 44 calculates (or simulates) and then prompts a suggested network element to the user based on a simulation or calculation triggered by the end point device on which the user is working. The suggestion is generated by the network forming unit 44 of the problem investigating device 35 and may be adapted depending on the other elements or configurations immediately connected to the same endpoint device. The same can be done with network nodes, e.g. prompting for a router or for a second (redundant) router which could be connected to a node or endpoint device.

The network forming unit 44 of the problem investigating device 35 may thus calculate what switches (and their switching functionality) and cables that are needed to connect the signals between the end point devices according to the communication requirements of the application.

The number of nodes needed may be calculated from a number of end point devices (sensors, actuators) and network nodes from the calculated amounts and frequency, latency etc. of data communication traffic required by one or more automation applications. More specifically the network forming unit 44 of the problem investigating device 35 may analyse one or more network layout configurations against constraints such as functional autonomy.

Functional autonomy of system applications (the functionality) is not a property of an application, but rather the relationship or lack of it between two or more applications. An application is considered to be autonomous if it is unaffected by changes made in relation to any other application. The degree of autonomy of a certain application thus depends on the degree with which changes or failures in another application affects it. One way to achieve functional autonomy (mutual independence) of applications is to use dedicated (mutually independent) resources for each application. Another way is the virtualization of shared resources.

The network layout configurations may then be arranged so that the endpoint devices, network routers and servers, as well as different communication paths (or parts of) will attain a required level of network KPIs/performance when running the required automation applications.

The network layout configurations may be relatively modular or otherwise designed to ensure functional autonomy of selected partitions of the resulting network to be created and validated during engineering. The network layout configurations may also be designed e.g. with redundant network nodes and alternative (redundant) paths in the network to ensure so-called graceful degradation. This means that degradation in performance or failure of one or more infrastructure element will still allow functioning, with reduced number of (alternative/redundant paths) and/or reduced (KPI) performance; preferably for selected automation applications.

Preferably the network layout designed for having functional autonomy and graceful degradation results in a functional integrity for network partitions, meaning that the degree of independence between their network elements is so high that unwanted problems or intentional changes within one partition do not affect the performance of any other partition. In consequence, this means that the functional integrity of different network users of the individual partitions is also guaranteed, and that misbehaviour of one application does not impact any other application.

In addition to the above, the network layout configurations may also be analysed and different communication paths and different nodes, routers and servers each assigned an indicator of criticality by the user. Criticality may be plant specific; it may be assigned based in part on a standard industrial methodology such as the NAMUR recommendation "Self-Monitoring and Diagnosis of Field Devices" NE107 issued by the international user association of automation technology in process industries NAMUR. Criticality may be related to both an industrial standard and also adapted for a specific plant (e.g. explosive zones (EX) as defined by the ATmosphere EXplosible (ATEX) directive such as areas, mines, dusty environments etc.). Network layout configurations are also assessed to obtain a limited number of critical nodes and communication paths by incorporating a preferred degree of redundancy. There may be a compromise made that is considered optimal with regard to the degree of redundancy implemented and the number of critical nodes used.

The criticality scale may use the following indications:
(good) green if selected to be shown at all
Red Failure Internal device failure
Blue maintenance required/demanded
Yellow out of specification
Orange function check In addition to the above, the network layout configurations may also be analysed, different nodes, routers and servers identified and each assigned an indicator of criticality.

For every link that is created between two endpoint devices in respect of a process control function, the network forming unit 44 of the problem investigating device 35 creates a series of dependencies or settings indicating the endpoint devices, process control functions, data communication requirements and communication network elements that are included in the link.

Figure 8:
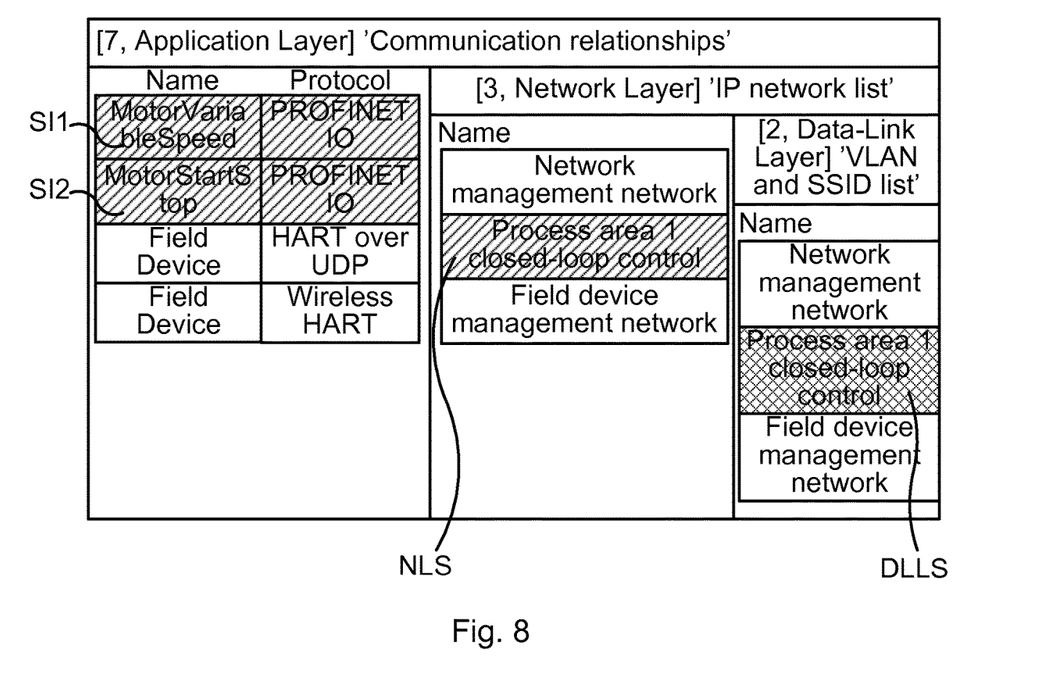
FIG. 8 shows a graphical representation of the system model, where dependencies between elements of a link are emphasized.

FIG. 8 shows a graphical representation of the system model, where the dependencies of a data link layer setting DLLS for a certain end point device, such as a control computer, are shown. It can be seen that the data link layer setting DLLS "Process Area Closed-Loop Control", which is indicated with a cross-hatched background, has a dependency on a network layer setting NLS "Process Area Closed-Loop Control" and a first and a second signal SI1 and SI2, "Motor Variable Speed Signal, Motor StartStop Signal" and the Profinet IO communication protocol, which is indicated with a hatched background.

Figure 9:
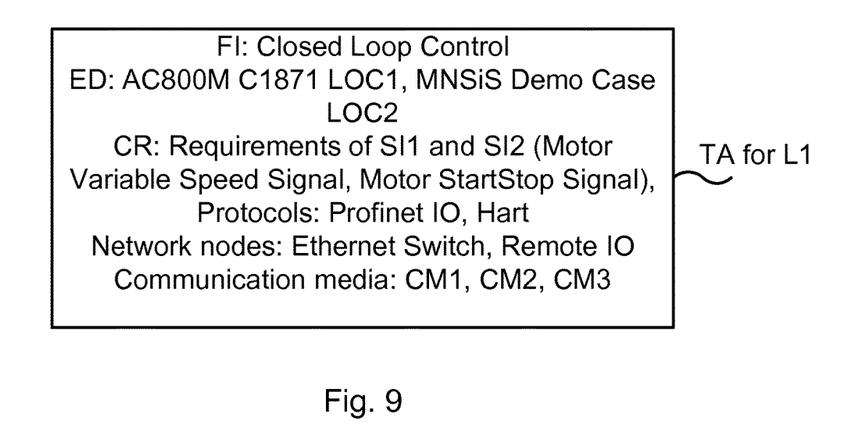

These dependencies may also be illustrated in the form of a tag TA for the link L1, where FIG. 9 schematically shows one such tag TA created for the first link L1 between the endpoint devices 18 and 24. The tag includes information about which software objects of the link L1 that have dependencies of each other. As can be seen the process control function FI for which data is sent over the link, the endpoint devices ED that are interconnected by the link as well as their locations LOC1 and LOC2, the communication requirements CR of the communication parameters, such as the timing and bandwidth requirements of the signals SI1 and SI2 and communication protocols used. Finally there is also information of the parts of the communication network used in-between the endpoint devices, such as the communication network devices and communication media used between them. There may also be data of the communication capability of these communication network elements.

If a criticality setting has been made for the link or the endpoint device and communication network elements, this may also be included in the tag.

It is possible that the process control device needs to communicate with more field devices in respect of the process control function. In this case a separate link and optionally also a tag may be provided for this connection.

The user can optimize a part of the system model offline by changing given constraints like the number of links (paths) needed, redundant links, redundancy principles, ring sizes, server or network nodes etc. until the modelled KPIs for the network fit to the KPIs from the communications requirements.

When all network suggestions have been made, the user may accept some or all of them and reject others. If there is a change of infrastructure, it will be reflected in the system model.

Once the user selections have been made and the suggested infrastructure accepted by the network planning user, the communication network elements, end point devices, functions and signals made for an end-to-end link are stored in the system model with a reference to each other. They may with advantage be stored as software objects defining the end point devices, their functions and signals and communication network elements. The dependencies may be stored as pointers, where a pointer in one software object may point to another software object. The code defining these software objects may with advantage be provided in the memory 38 of the problem investigating device 35. As an alternative it may be stored in the database 16. It should be realized that a pointer is merely one way in which a dependency may be provided.

Once a final system model has been decided, a corresponding real system may then be built using real infrastructure elements corresponding to the virtual infrastructure elements defined in the finalised system model design.

For instance, once the system model of the communication network has been determined, it is then possible to export the configuration parameters for every object in the model (endpoint devices and network elements) and download the configurations for each of the respective objects into a real network built according to the system model. Thus a configuration is calculated for each router, bridge and so on and these configurations are downloaded into each of the (unique) components in the network. By taking the device parameters from the system model, there is a single point of reference or data entry. Thereby inconsistencies between device parameters and intended design can be found and resolved easily.

There may occur problems in the real implemented process control system 10. There may for instance occur faults such as broken cables or faulty switches or signals may be too slow or bandwidth requirements not met. It may be hard to determine where in the real communication network a problem occurs. However, when such a fault occurs, then typically a communication parameter may fail a communication requirements set up for this parameter. This may in turn be used to locate where the problem occurs. It is according to aspects of the invention possible to identify a probable cause of the problem through making investigations in the system model with regard to the above-mentioned communication parameter.

This may be done for determining if there is a fault or if some part of the system deviates from system requirements, such as if a communication requirement set for a certain process control function is not fulfilled. When there is such a deviation, there is thus a discrepancy between the communication requirement and the corresponding system performance.

Figure 10:
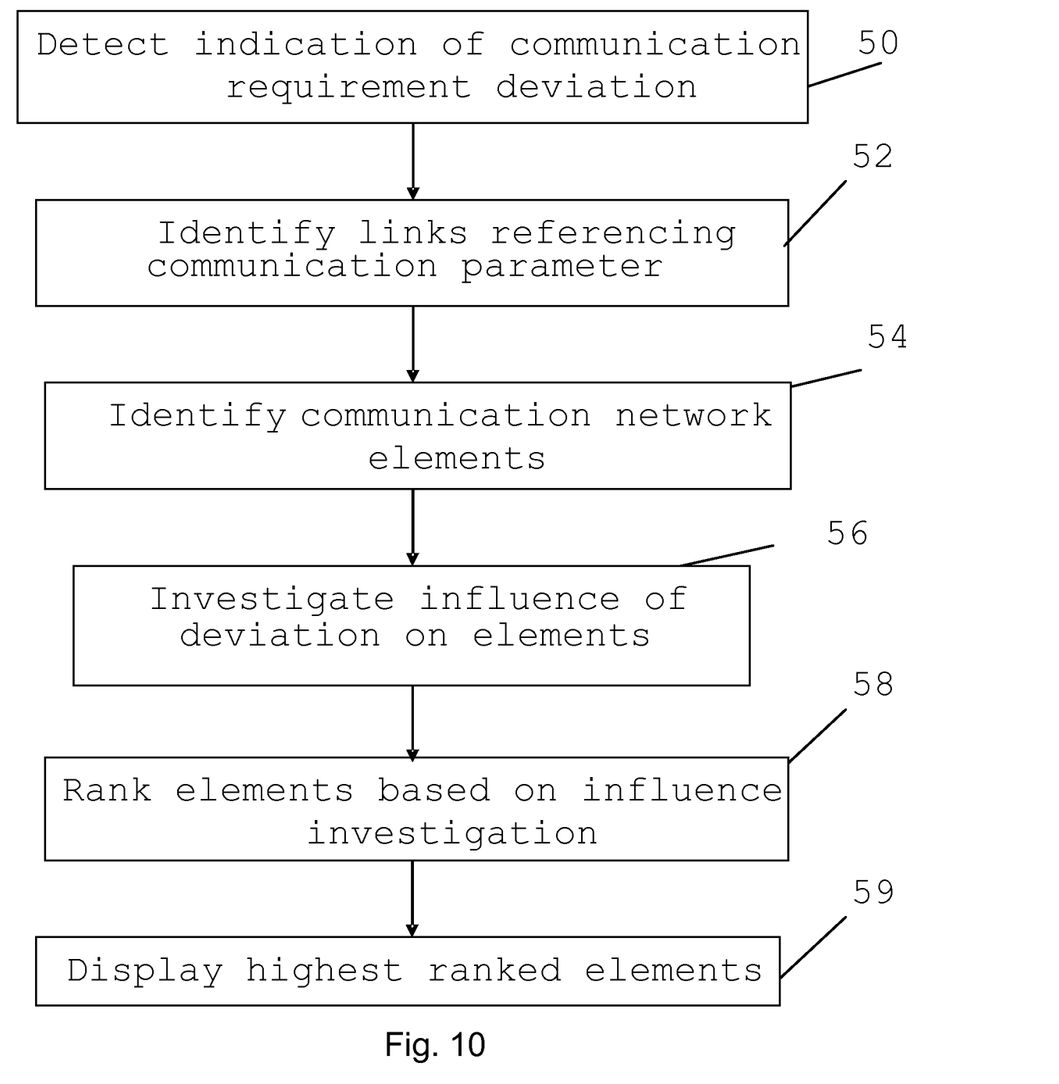

One way of handling a discrepancy will now be described with reference being made to FIG. 10, which shows a flow chart of a number of method steps in a method of locating a possible root cause of a system discrepancy and being performed by the root cause analyzing unit 46 of the problem investigating device 35.

Before root cause analysis is performed, the root cause analyzing unit 46 may scan the actual communication network with regard to network layout configuration and topography, such as finding out which real-life process control devices are connected to what real-life communication network elements and map these to the virtual endpoint devices and virtual communication network elements in order to find the correspondence between the real communication network and the communication network of the system model. The scanning may also involve scanning one or more resource files that detail the as-planned automation process control functions and compare these files with the scanned network. The mapping may more particularly comprise identifying the above-mentioned communication links. As an alternative, it is possible that such a mapping has already been made at the time of implementation of the real communication network. A further optional step is to scan the network layout and compare layout and configuration.

When root cause analysis is to be performed, the problem investigating device 35 may obtain an indication that at least one communication parameter deviates from a corresponding communication requirement, step 50. This may be done through the problem investigating device detecting an indication in the process control system. It may also receive such an indication from a separate system monitoring unit, which may be provided in the process control system. In one variation the deviation is a deviation of an actual communication network performance detected in the actual communication network from a communication requirement and exported from the real process control system 10 to the problem investigating device 35. It is for instance possible that a deviation from one or more communication requirements of communication parameters is reported from the process control system 10 to the route cause analyzing unit 46. The communication parameter may be a communication parameter related to a process control function running in the process control system under the control of an application in the real process control computer 18. Such an indication in the form of the report of discrepancy may for instance be imported from the real operator terminal 12 or from the real process control computer 18.

A deviation may be a key performance indicator (KPI) for a communication parameter being outside of its range such as a signal that has too high a latency or is even missing. It may also be a bandwidth being too limited.

The reporting may also optionally provide information about which process control function the communication requirement failed.

Thereafter the root cause analyzing unit 46 investigates the links in the system model with regard to the communication parameter. The investigation may more particularity involve identifying links where reference is made to the communication parameter, step 52. If the links are provided with tags in the above-described way, then these may be investigated to find out if they mention the communication parameter. The investigation may thus involve the problem investigating device 35 obtaining the tags of links that reference the communication parameters for which a deviation was detected. It is possible that only one process control function provided by a process control application uses the communication parameter. Then it is possible to determine the application in question through the knowledge of which communication parameters fail a communication requirement. In this case, then only the tags associated with the application performing this specific function are obtained.

If tags are not used for indicating communication requirements, the root cause analyzing unit 46 may locate the links based on first finding a virtual device that references the communication requirement and then identifying the link that comprises the virtual device.

In both cases it is possible that the investigation of links is ended as soon as a link referencing the communication parameter in question is found. Alternatively it is possible that all links are investigated.

The problem investigating device 35 then investigates the links obtained in step 52 with regard to communication network elements. It thereby identifies the communication network elements that contribute to the functioning of the link, step 54. This may be done through identifying the communication elements of an identified link that reference the communication parameter, which elements are candidates for being responsible for the deviation. It is possible that network elements have a direct reference to the communication parameter, for instance through including a pointer to the communication parameter. It also possible that a network element has an indirect reference in that one of the devices of the link has a reference to the communication parameter and a network element comprises a pointer to that device. The investigation of a link may thus be an investigation about which communication infrastructure elements that the link passes and at the same time references the communication parameter.

The investigation of a link may furthermore be seen as an investigation of a virtual signal trace, i.e. the path that a signal (or any communication) takes through the components, functions, and layers of the network in the system model.

If for instance the delay of a Motor Start Stop signal in a closed loop control function for the link L1 is too high, this would mean that the first, second and third communication media CM1, CM2 and CM2 as well as the first Ethernet switch 48 and the first remote IO device 20 would all be candidates for being the cause of the deviation.

Thereafter the root cause analyzing unit 46 of the problem investigating device 35 makes an optional investigation of the influence of the deviations on the communication network elements, step 56. This may involve investigating the type of communication parameter and type of discrepancy and estimating a candidate communication network element based on the type investigations. Different types of communication network element may have different probabilities for being responsible for different types of deviations. If there are discrepancies in several communication parameters the investigation of the influence may involve investigating how many of the communication parameters a network element references. In the case of signals, the investigation may involve identifying how many of the signals that deviate from a corresponding communication requirement, for instance deviating KPIs, that are referenced by and thereby pass through the identified communication network elements.

The elements may then be ranked according to the investigation, step 58, for instance according to which element has the highest number and/or fractions of deviating KPIs passing through them or based on the type investigations. Different network elements may also have different failure probabilities. The ranking may as an alternative or in addition be based on a statistical failure probability of network element type. Through this ranking it is then possible to obtain the likely cause of the deviation and an order of probability.

The root cause analyzing unit 46 may thereafter indicate at least one of the communication network elements as a possible cause of the deviation based on the network element investigation in step 54 and optionally also on the influence investigation in step 56. This may be done through displaying one or more of the communication network elements with the highest probability of being the cause of the deviation, step 59. The top list may thus be presented to the troubleshooting user via the user interface 42, which user may thereafter replace one or more of the highest ranked elements.

Thereby it is possible to locate a faulty communication network element in a fast and simple way, which is especially important in case the process control system and communication network are both large and complex. This allows a user to work on solutions for solving the root problem instead of dwelling on a possibly large number potential problems.

The problem investigating device 35 thus identifies a communication parameter difference or a "problem" in an end to end route between two end point devices, e.g. KPI violations, possibly by being informed by a process control function using the communication network that the QoS is not satisfactory, and having investigated the dependencies of the software objects in a link between two end point devices. The problem investigating device 35 then identifies which communication media and/or nodes can technically be responsible (in this excluding a potentially large number of links and nodes which can be excluded from the root cause analysis and from user view); ideally, it also ranks the links and nodes from which the cause is most likely to have originated.

If there are criticality settings for the communication network elements, it is also possible that the criticality of the communication network elements that are possible causes of the deviation is indicated at the same time as a possible root cause is indicated.

Here it may be mentioned that it is possible for the root cause analyzing unit 46 to place communication network elements that reference the same communication parameters in a common group and only display the highest ranked communication network element in the group to the user. This means that of all communication network elements that reference a deviating communication parameter only the one that is deemed to be the most likely cause of the deviation may be displayed. This has the advantage of removing superfluous information and a consequential faster identification of a root cause of the deviation.

It is possible to use various types of simulations in the system model in relation to root cause analysis. It is for instance possible to set a communication infrastructure element as faulty in the system model. The problem investigating device 35 may then indicate the links that are affected. It is also possible to indicate the signals that are affected as well as the end point devices and process control functions affected. Thereby the seriousness of a faulty communication network element for the function of the process control system may be evaluated. The seriousness of a faulty communication network element may furthermore be emphasized if it is associated with a criticality setting.

A communication medium or node identified as most likely to have a fault or configuration problem etc. may thus be indicated in the system as faulty, e.g. as line down or device down. The problem investigating device 35 may then also generate a series of items or components associated with or which are part of, the route to be checked; optionally the problem investigating device 35 compares the network KPIs of the as-designed network with the relevant KPIs for the problem situation.

The problem investigating device 35 may identify and display the network parts that are used by each of the one or more process control functions on a graphic display or interface, optionally with an indicator on the display for tags referencing communication media and/or nodes, function devices, network functions, network devices and other elements, and generates a list of items to be checked.

Another way of using simulations is through injecting an error, disturbance or anomaly into the communication network of the system model, monitor the response of the system model to the anomaly through recording measurements, calculations or simulations of the result(s) and thereafter investigate if the response deviates from the communication requirement. Since the problem investigating device 35 knows about the applications that reference network elements along with needed KPIs, it can use this knowledge to "challenge" the communication network by provoking particularly demanding situations; it can e.g. trigger redundancy mechanisms by injecting failures in main communication connections, then validating the actual reconfiguration time of the network. Subscriptions to planned elements may be used to show performance KPIs for the process control function sections offline; or else subscriptions to actual online values may be used to show performance KPIs for the process control functions in real time, with an option to visualize a comparison value for the as-designed network part.

An introduced anomaly may also be used for determining the effectiveness of the root cause analyzing unit 46. An anomaly may for instance be introduced through setting a virtual network element in the system model to be faulty or broken. The root cause is thus known. The system response to the introduced anomaly would then lead to a communication parameter failing to meet a corresponding communication requirement, such as a signal not being received at all.

An indication of a deviation would thus in this case be obtained as the system response to the introduced anomaly.

The root cause analyzing unit 46 then investigates the links with network elements that reference the communication requirement and more particularly investigates if the network element with the introduced anomaly is indicated as a possible cause of the deviation and possibly the highest ranked element. If it is then the root cause analyzing unit 46 operates satisfactorily. However, if the known network element is not a candidate then the operation of the root cause analyzing unit 46 may be deemed to be unreliable.

In this way the problem investigating device may be tested in the context of a specific network. It is possible to in advance determine if communication network problems that may occur in the process control system can be detected as well as perhaps which problems that it is possible to detect and which are not detectable.

The problem investigating device 35 may also provide additional support for SAT (site acceptance tests). As mentioned above, the problem investigating device 35 can compare network performance and KPIs of the planned and modelled network with scanned information from the network as built. This aspect may be used in SATs where for each case, the KPIs of the installed network as built are investigated and compared with selected parameter values and/or with KPIs as calculated for the planned, modelled network. One or more tests with some input data related to each intended operational activity will be carried out for each test case of the SAT. This may be extended to examine selected parts of the as-built network (backbone parts, database parts, wireless links, wireless networks) and/or according to a use case for a selected automation application. When examining communication traffic in a section the references of each functional part in an end-to-end communication route may be determined/calculated/retrieved and displayed for a user to identify a network object which may contain a "root cause" of a problem or fault. The network object is then examined more closely and a configuration adjusted.

It is generally possible to perform other simulations than the ones described in relation to root cause analysis.

It is for instance possible to select a part of the communication network for analysis and thereafter to simulate data communication parameters in the part of the network so selected, to carry out at least one test with input data related to an operation in a process controlled by one of the one or more process control functions, record any alarm and/or event that occurs in the simulation during the at least one test, identify at least one alarm and/or event and associate it with a criticality definition, and for each alarm and/or event with a criticality greater than a predetermined value, to further display an alarm with an indicator of the criticality and generate an alarm signal.

It is also possible to carry out an automated validation on a network layout configuration produced by the system model. Validation may include testing, such as injecting a virtual disturbance, then validating if the system is still up to specification. Results of a test or validation may then be evaluated and matched to a criticality scale and one or more alarms generated with visual and/or audio signals. Other variations may include validation of available alternative paths upon a switch or router failure. Other validations may also be possible, e.g. for validating broadcast domains.

Network problems may also be mapped to a criticality hierarchy, using a rule set defined in planning. A user may, as was discussed earlier, define criticality on the network elements. Alternatively the user may define criticality on the functional nodes, i.e. on the endpoint devices involved in the control of the process, for instance by importing it from project description files. Alternatively the user may assign criticality to the process control functions, in which case the same criticality may be assigned to the endpoint devices used in the function and also to the network nodes and communication media that the functions uses in the communication network.

As was mentioned above, the problem investigating device 35 may communicate with network scanning tools and functional description resources to carry out an automated validation on a network layout configuration produced by the system model.

The injection of a disturbance can also be used to investigate whether one or more communication parameter fulfils communication requirements set out for a process control function. Above one way of determining a system model was described. It should be realized that there are alternative ways in which a system model may be determined. One such other way of determining a system model of an actual communication network is to perform a topology scan of the actual communication network and inversely try to guess the applications or at least logical network functions.

Another way of determining the system model of the communication network may be through expanding network functions from parameter upload out of the devices, i.e. go the inverse way and derive at least logical network functions. It may even be possible to guess process control functions.

This may be done in the following way. First a physical topology scan is run. Then device parameters are uploaded.

For example, it is possible to read out the IP addresses, bus identifiers on ports, Media Access Control (MAC) filters, Virtual Local Area Network (VLAN) identifiers etc. from these, network functions like Internet Protocol (IP) networks may be inferred.

The process control functions may be estimated from any evidence the scan would find. Endpoints that are connected to each other in segments or have reserved time or bandwidth resources may for instance be pointers towards high sampling frequencies and closed loop control Other circumstances that may be used for estimations comprise the detection of a presence of any particular class of process control computer object or tag type or something else that would identify a "type" of application that normally "uses" the tag. There may for instance be security indicators e.g. EX explosion risk plant areas or functions.

In general, it is possible to look at the type of device (without reading its functional configuration for the above-mentioned reasons); which is then combined with the established network connectivity (segments, firewall holes, MAC filters) to obtain an estimation of the applications and application connections.

The user can then refine the estimate by adding QoS information, splitting or combining separate applications, etc.

The network topology is thus scanned and the result of the scan used to obtain an assumption of the network functionality. This is done through data analysis, such as matching resource configurations against typical application patterns. For example: when field instruments and process controllers along with network connections, redundant rings and Virtual Local Area Networks (VLANs) are found, it is possible to estimate with high certainty which devices talk to which controller for a closed-loop control application. The same can be done for a network being configured to connect video cameras to a server.

Since the problem investigating device 35 also includes the rationale why it infers anything, the user can also understand the estimate and trace were it went wrong or where details must be added (e.g. from customer specification). The user may for instance have non-machine-readable information about the applications that are running. If the algorithm comes to a wrong conclusion, the user may find out the reason and add the missing/wrong data on which the algorithm based its conclusion.

Furthermore, root-cause analysis may also be performed in relation to logical locations, such as buildings, rooms, cabinets, process areas, etc.

The invention has several advantages. Process control functions are tied to communication network elements and the layering of modern communication protocols is exploited, in order to automatically determine possible root causes. Subsequently it is possible to rank the most likely root causes in automatic fashion.

Thereby the downtime of the process control system may be limited. Network problems can be found fast and reliably, reducing downtime risks or actual downtime of the process or process-related functions. Thereby the process control system also becomes more reliable overall.

The locating of the root cause can be done without relying on specially trained experts.

Aspects of the invention have above been described with reference only to process control. It should be realized that the communication network may also be used for auxiliary functionality such as (e.g. telecom, video) using the communication infrastructure. He above described profiles may be used also for this auxiliary functionality.

Figure 11:
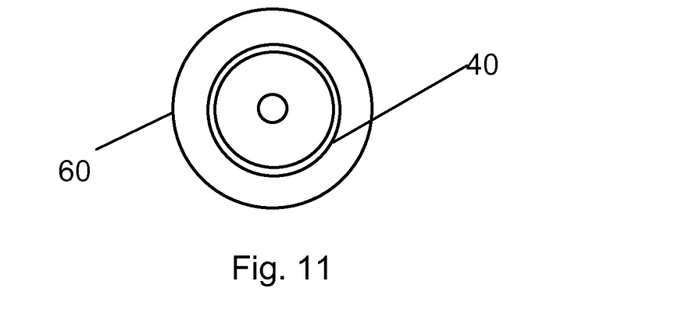
FIG. 11 shows a data carrier with computer program code, in the form of a CD-ROM disc, for performing the steps of the method.

The problem investigating device may, as was previously mentioned, be provided in the form of one or more processors together with computer program memory including computer program code for performing its functions. This computer program code may also be provided on one or more data carriers which perform the functionality of the problem investigating device when the program code is being loaded into a computer forming the problem investigating device. One such data carrier 60 with computer program code 40, in the form of a CD ROM disc, is schematically shown in FIG. 11. Such a computer program may as an alternative be provided on another server and downloaded therefrom into the problem investigating device.

The invention claimed is:

1. A problem investigating devices for a process control system, the device comprising:
   a system model having software representations of process control endpoint devices interconnected via a communication network using a number of links, where each link is provided for communication in relation to a process control function between two endpoint devices and includes a set of communication network elements and a reference to a set of communication parameters of the process control function, where at least one communication network element references the communication parameters, and
   a root cause analysing unit configured to:
      obtain an indication that at least one communication parameter deviates from a corresponding communication requirement,
      identify a link from the number of links where reference is made to the at least one communication parameter,
      identify the communication network elements contributing to the functioning of the link,
      indicate at least one of the communication network elements as a possible cause of the deviation based on the identification of the communication network elements, and
   wherein the root cause analyzing unit is further configured to:
      rank the communication network elements according to a probability of being the cause of the deviation.

2. The problem investigating device according to claim 1, wherein the root cause analyzing unit, when indicating the possible cause of the deviation, is configured to display one or more of the communication network elements with the highest probability of being the cause of the deviation.

3. The problem investigating device according to claim 1, wherein the indication concerns more than one communication parameter and the root cause analyzing unit is further configured to investigate how many of the communication parameters a communication network element references.

4. The problem investigating device according to claim 3, wherein the communication parameters comprise signals and the root cause analyzing unit is configured to investigate how many of the signals that deviate from a corresponding communication requirement referencing an investigated communication network element when investigating how many of the communication parameters a network element references.

5. The problem investigating device according to claim 3, wherein the root cause analyzing unit is further configured to place communication network elements that reference the same communication parameters as a communication network element that has been determined to be a cause of a deviation in a common group and where the indicating comprises displaying only the communication network element of the group determined to be the cause of the deviation to a user.

6. The problem investigating device according to claim 1, wherein the root cause analyzing unit is further configured to indicate criticality associated with the communication network elements when indicating the at least one of the communication network elements as the possible cause of the deviation.

7. The problem investigating device according to claim 1, wherein the indication is an indication received from an actual process control system formed according to the system model.

8. The problem investigating device according to claim 1, wherein the indication is obtained through a simulation being performed in the system model.

9. The problem investigating device according to claim 8, wherein the root cause analyzing unit when being configured to obtain the indication is further configured to introduce an anomaly in a network element of the system model and monitor the response of the system model to the anomaly, where the indication of a deviation in at least one communication parameter is obtained through the response of the system model, the root cause analyzing unit being further configured to investigate if the network element with the introduced anomaly is indicated as a possible cause of the deviation.

10. The problem investigating device according to claim 1, wherein the communication network elements comprise communication media and communication nodes.

11. A method for locating a possible root cause of system discrepancy in a process control system using a system model having software representations of process control endpoint devices interconnected via a communication network using a number of links, where each link is provided for communication in relation to a process control function between two endpoint devices and comprises a set of communication network elements and a reference to a set of communication parameters of the process control function, the method being performed by a root cause analyzing unit of a problem investigating device and comprising:
- obtaining an indication that at least one communication parameter deviates from a corresponding communication requirement,
- identifying a link from the number of links where reference is made to the at least one communication parameter,
- identifying the communication network elements that contribute to the functioning of the link, and
- indicating at least one of the communication network elements as a possible cause of the deviation based on the identification of the communication network elements, wherein the method further comprises:
- ranking the communication network elements according to a probability of being the cause of the deviation.

12. The method according to claim 11, wherein the indicating of the possible cause of the deviation comprises displaying one or more of the communication network elements with the highest probability of being the cause of the deviation.

13. The method according to claim 11, wherein the indication concerns more than one communication parameter and further comprising investigating how many of the communication parameters a communication network element references.

14. The method according to claim 13, wherein the communication parameters comprise signals and investigating of how many of the communication parameters a communication network element references comprises investigating how many of the signals that deviate form a corresponding communication requirement referencing an investigated communication network element.

15. The method according to claim 13, further comprising placing the communication network elements that reference the same communication parameter in a common group with a communication network element that has been determined to be a cause of a deviation, where the indicating comprises displaying only the network element of the group that has been determined to be the cause of the deviation.

16. The method according to claim 11, further comprising indicating criticality associated with the communication network elements when indicating the at least one of the communication network elements as the possible cause of the deviation.

17. The method according to claim 11, wherein the indication is an indication received from an actual process control system formed according to the system model.

18. The method according to claim 11, wherein the indication is obtained through a simulation being performed in the system model.

19. The method according to claim 18, wherein the obtaining of the indication comprises introducing an anomaly in a network element of the system model and monitoring the response of the system model to the anomaly, where the indication of a deviation in at least one communication parameter is obtained through the response of the system model and further comprising investigating if the network element with the introduced anomaly is indicated as a possible cause of the deviation.

20. A computer program product for locating a possible root cause of system discrepancy in a process control system using a system model having software representations of process control endpoint devices interconnected via a communication network using a number of links, where each link is provided for communication in relation to a process control function between two endpoint devices and includes a set of communication network elements and a reference to a set of communication parameters of the process control function, said computer program product being provided on a data carrier comprising computer program code configured to cause a problem investigating device to, when said computer program code is loaded into said problem investigating device,
- obtain an indication that at least one communication parameter deviates from a corresponding communication requirement,
- identify a link from the number of links where reference is made to the at least one communication parameter,
- identify the communication network elements that contribute to the functioning of the link, and
- indicate at least one of the communication network elements as a possible cause of the deviation based on the identification of the communication network elements, and wherein said computer program code is further configured to cause the problem investigating device to:
- rank the communication network elements according to a probability of being the cause of the deviation.

21. A problem investigating device for a process control system, the device comprising:
- a system model having software representations of process control endpoint devices interconnected via a communication network using a number of links, where each link is provided for communication in relation to a process control function between two endpoint devices and includes a set of communication network elements and a reference to a set of communication parameters of the process control function, where at least one communication network element references the communication parameters, and
- a root cause analyzing unit configured to:
  - obtain an indication that at least one communication parameter deviates from a corresponding communication requirement,
  - identify a link from the number of links where reference is made to the at least one communication parameter,
  - identify the communication network elements contributing to the functioning of the link,
  - indicate at least one of the communication network elements as a possible cause of the deviation based on the identification of the communication network elements, and wherein the root cause analyzing unit is further configured to:
- indicate criticality associated with the communication network elements when indicating the at least one of the communication network elements as the possible cause of the deviation.

22. A method for locating a possible root cause of system discrepancy in a process control system using a system model having software representations of process control endpoint devices interconnected via a communication network using a number of links, where each link is provided for communication in relation to a process control function between two endpoint devices and comprises a set of communication network elements and a reference to a set of communication parameters of the process control function, the method being performed by a root cause analyzing unit of a problem investigating device and comprising:
- obtaining an indication that at least one communication parameter deviates from a corresponding communication requirement,
- identifying a link from the number of links where reference is made to the at least one communication parameter,
- identifying the communication network elements that contribute to the functioning of the link, and
- indicating at least one of the communication network elements as a possible cause of the deviation based on the identification of the communication network elements, wherein the method further comprises:
- indicating criticality associated with the communication network elements when indicating the at least one of the communication network elements as a possible cause of the deviation.

23. A computer program product for locating a possible root cause of system discrepancy in a process control system using a system model having software representations of process control endpoint devices interconnected via a communication network using a number of links, where each link is provided for communication in relation to a process control function between two endpoint devices and includes a set of communication network elements and a reference to a set of communication parameters of the process control function, said computer program product being provided on a data carrier comprising computer program code configured to cause a problem investigating device to, when said computer program code is loaded into said problem investigating device,
- obtain an indication that at least one communication parameter deviates from a corresponding communication requirement,
- identify a link from the number of links where reference is made to the at least one communication parameter,
- identify the communication network elements that contribute to the functioning of the link, and
- indicate at least one of the communication network elements as a possible cause of the deviation based on the identification of the communication network elements, wherein said computer program code is further configured to cause the problem investigating device to:
- indicate criticality associated with the communication network elements when indicating the at least one of the communication network elements as the possible cause of the deviation.

* * * * *